United States Patent [19]
Lin

[11] Patent Number: 6,072,284
[45] Date of Patent: Jun. 6, 2000

[54] THREE-WAY COMPACT FLUORESCENT LAMP BALLAST AND LAMP HOLDER INCORPORATING SAME

[75] Inventor: Lin Lin, Clifton, N.J.

[73] Assignee: Duro-Test Corporation, Bloomfield, N.J.

[21] Appl. No.: 09/118,974

[22] Filed: Jul. 20, 1998

[51] Int. Cl.[7] .................................................. G05F 1/00
[52] U.S. Cl. .................... 315/307; 315/291; 315/200 R; 315/209 R; 315/DIG. 4; 315/DIG. 7
[58] Field of Search ................................. 315/51, 56, 61, 315/63, 105, 200 R, 205, 225, 291, 209 R, DIG. 4, DIG. 7, 244, 307

[56] References Cited

U.S. PATENT DOCUMENTS

| | | | |
|---|---|---|---|
| 2,278,256 | 3/1942 | Frech | 176/124 |
| 2,735,961 | 2/1956 | Hamilton | 315/100 |
| 3,611,024 | 10/1971 | Nakatsu et al. | 315/205 |
| 3,975,660 | 8/1976 | Knobel et al. | 315/102 |
| 4,178,535 | 12/1979 | Miller | 315/53 |
| 4,348,612 | 9/1982 | Morton | 315/58 |
| 4,349,768 | 9/1982 | Miller | 315/105 |
| 4,358,709 | 11/1982 | Magai | 315/99 |
| 4,367,434 | 1/1983 | Miller | 315/51 |
| 4,383,204 | 5/1983 | Roberts | 315/291 |
| 4,386,296 | 5/1983 | Beck | 315/53 |
| 4,593,231 | 6/1986 | Wisbey et al. | 315/100 |
| 4,772,824 | 9/1988 | Gulledge | 315/291 |
| 5,309,062 | 5/1994 | Perkins et al. | 315/53 |
| 5,420,481 | 5/1995 | McCanney | 315/291 |
| 5,424,610 | 6/1995 | Pelton et al. | 315/58 |
| 5,539,281 | 7/1996 | Shackle et al. | 315/224 |
| 5,650,694 | 7/1997 | Jayaramman et al. | 315/225 |
| 5,691,603 | 11/1997 | Nilssen | 315/209 R |
| 5,719,471 | 2/1998 | Kachmarik | 315/209 R |
| 5,831,395 | 11/1998 | Mortimer et al. | 315/307 |

*Primary Examiner*—Haissa Philogene
*Attorney, Agent, or Firm*—Emrich & Dithmar

[57] ABSTRACT

A compact fluorescent lamp and an electronic ballast therefor are mounted on a three-terminal base which can be fitted into a three-way-switched standard AC lamp socket, so as to be responsive to the three powered switch positions of the socket for generating three light output levels. The ballast includes an AC-to-DC conversion circuit which supplies a lamp driver including a DC-to-AC conversion circuit, an oscillatory circuit and a resonant circuit. In one embodiment the AC-to-DC conversion circuit includes a full bridge rectifier and a voltage doubler producing two operating voltage levels for the lamp driver and two frequency control voltage levels for the oscillator, the ballast generating three light output levels by using two operating voltages and two operating frequencies. One of the lamp filaments is connected in series with the supply circuit for the oscillator so that the oscillator is inoperative when the lamp is disconnected or its filament burns out, and there is a feedback circuit from the resonant circuit to the oscillator supply for stabilizing its operating frequency. In another embodiment the AC-to-DC conversion circuit includes a half bridge rectifier and two voltage doublers for producing three operating voltages for the lamp driver to generate the three light output levels.

19 Claims, 4 Drawing Sheets

THREE-WAY COMPACT FLUORESCENT LAMP BALLAST AND LAMP HOLDER INCORPORATING SAME

BACKGROUND OF THE INVENTION

The present invention relates to lighting fixtures and, more particularly to fluorescent lamp holder fittings which are adapted to screw into standard incandescent lamp sockets. The invention has particular application to lamp fixtures adapted to fit in three-way lamp sockets for producing three light output levels.

Three-way lamp sockets are typically used with special three-way incandescent lamps. The incandescent bulb is made with two filaments inside the bulb and three contact terminals on the base of the lamp. The socket has a three-way switch for operating the three-way lamp. In one switch position, the AC power supply is connected across a first pair of the lamp terminals for supplying power to a first one of the lamp filaments to give a first lamp output level. In a second switch position, the supply is connected across a second pair of the lamp terminals to supply power to a second filament to give a second light output level. In the third switch position, the supply is connected across both pairs of lamp terminals in parallel, to supply both of the filaments in parallel to give the third output level.

Energy saving compact fluorescent lamps are gradually replacing incandescent lamps, such fluorescent lamps being adapted to be screwed into the standard lamp socket. Efforts have also been made to provide three-way fluorescent lamps which can be used in three-way lamp sockets. For this purpose a number of types of dimmers has previously been used for varying the lamp current and/or voltage, but such prior arrangements have encountered a variety of problems, including cost, efficiency, reliability, power consumption and lamp start-up and running at low output levels.

Some manufacturers have tried to change the fluorescent lamp output by changing its operating frequency. However, such lamp units have required an extra input besides the line input, and have also required a separate switch. Such arrangements cannot be used with a standard three-way lamp socket of the type commonly used with incandescent three-way lamps.

SUMMARY OF THE INVENTION

It is a general object of the invention to provide an improved three-way fluorescent lamp unit and ballast therefor which avoid the disadvantages of prior lamps and ballasts while affording additional structural and operating advantages.

An important feature of the invention is the provision of a fluorescent lamp ballast which is capable of producing multiple light output levels, while being of relatively simple and economical construction.

A further feature of the invention is the provision of a ballast of the type set forth, which ensures start-up at all lamp output levels.

Yet another feature of the invention is the provision of a ballast of the type set forth, which utilizes only three input terminals.

A further feature of the invention is the provision of a compact, multiple-light-level, fluorescent lamp unit incorporating a ballast of the type set forth and usable in a standard three-way-switched AC lamp socket for controlling the different light output levels.

Yet another feature of the invention is the provision of a method of controlling multiple light output levels of a fluorescent lamp unit by varying both its operating voltage and its operating frequency.

Certain ones of these and other features of the invention may be attained by providing a ballast for a multiple-light-level fluorescent lamp circuit comprising: an AC-to-DC conversion circuit having three input terminals and an output and including a rectifying circuit connected directly to a first terminal set including at least a first one of the input terminals and a voltage multiplying circuit connected to a second terminal set including at least a second one of the input terminals for producing plural DC output voltage levels, and a DC-to-AC conversion circuit having an input connected to the output of the AC-to-DC conversion circuit and an output adapted to be coupled to the associated lamp and having plural output conditions respectively corresponding to the DC output voltage levels.

Further features of the invention may be attained by providing a compact, multiple-light-level, fluorescent lamp unit for use in a three-way-switched AC lamp socket comprising: a three-terminal base adapted to fit in the socket; a fluorescent lamp supported on the base; and a ballast mounted on the base and including a non-inductive rectifying and voltage-multiplying circuit having three input terminals respectively connected to the terminals of the base and generating a DC output having a variable voltage depending on the switch condition of the socket, and a lamp drive circuit coupled to the output of the rectifying and voltage-multiplying circuit and generating an oscillatory drive signal coupled to the lamp for operating same at a light output level which varies with the DC output voltage.

Still other features of the invention may be attained by providing a method of varying the light output level of a fluorescent lamp having a ballast circuit, comprising: varying the operating voltage of the ballast circuit, and varying the operating frequency of the ballast circuit.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

DESCRIPTION OF THE PREFERRED EMBODIMENTS

Figure 1:
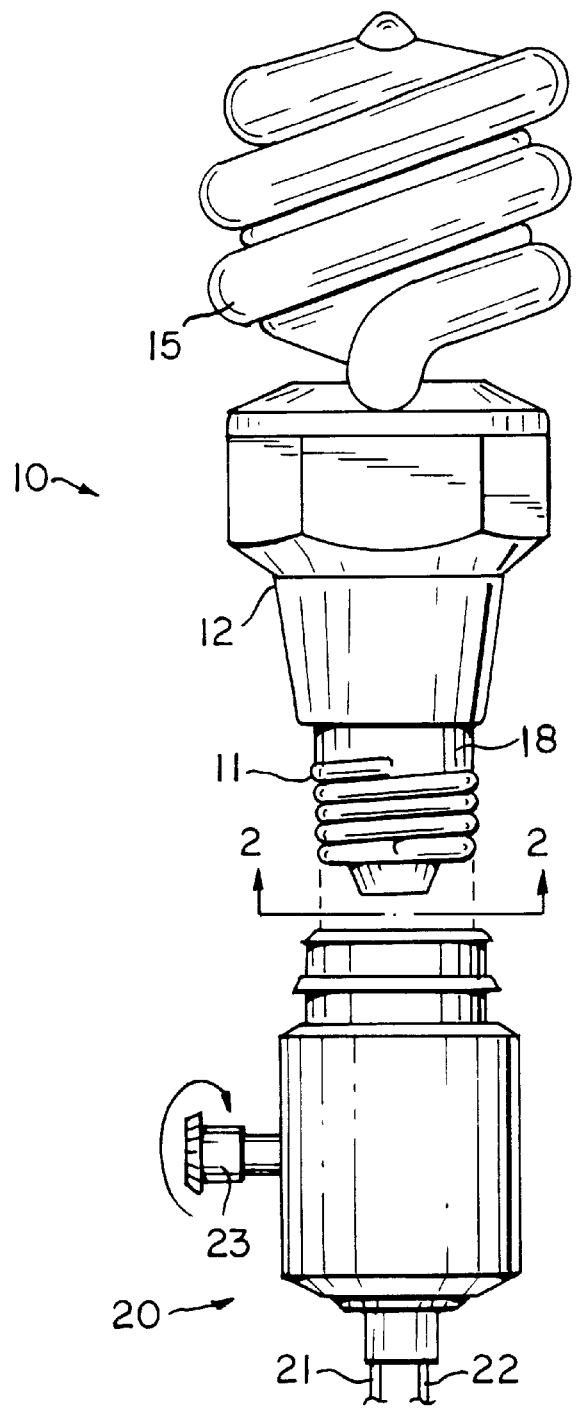
FIG. 1 is an exploded, side elevational view of a three-way fluorescent lamp unit in accordance with the present invention and a three-way lamp socket with which it may be used.
Figure 2:
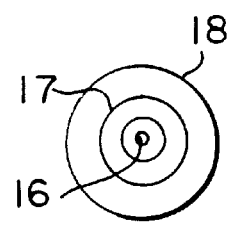
FIG. 2 is a bottom plan view of the lamp unit of FIG. 1, taken along the line 2—2 therein.

Referring to FIGS. 1 and 2, there is illustrated a three-way fluorescent lamp unit, generally designated by the numeral 10, in accordance with the present invention, the lamp unit 10 having a screw-type base 11 supporting a housing 12. Mounted on the housing 12 is a fluorescent lamp 15 of known construction. The lamp base 11 has three contacts or terminals 16, 17 and 18. The lamp base 11 is adapted to be screwed into a standard three-way lamp socket 20, which is provided with a neutral wire 21 and a hot wire 22 adapted to be connected across a standard 120 VAC source, in a known manner. The socket 20 has a knob 23 for controlling a three-way switch in a known manner.

Figure 3:
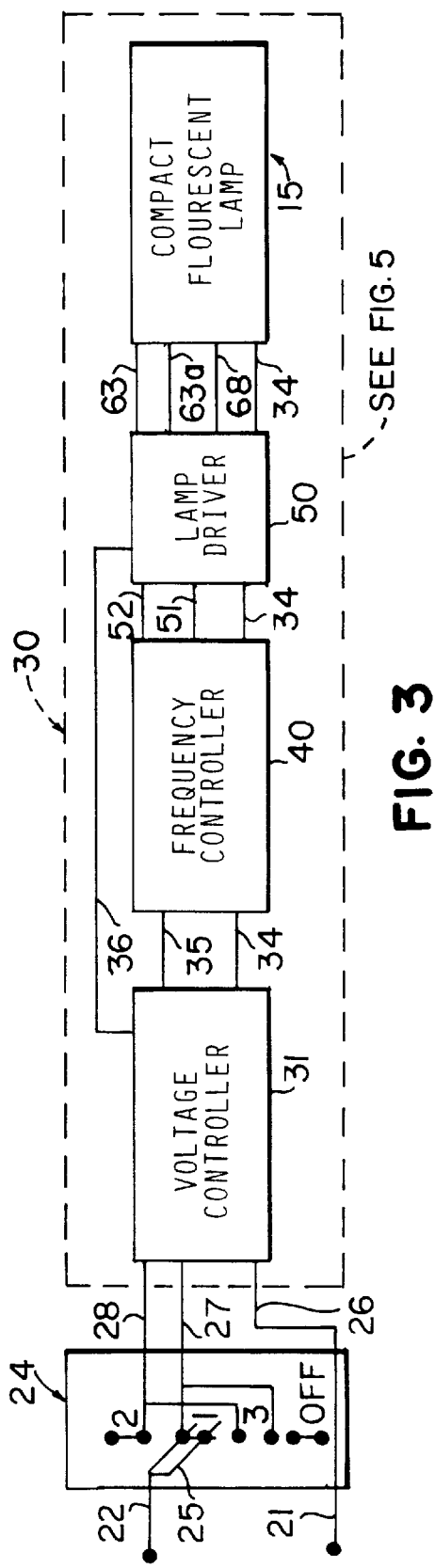
FIG. 3 is a partially schematic and partially functional block diagrammatic illustration of the lamp socket and lamp unit of FIG. 1, incorporating a first embodiment of electronic ballast for the lamp.

Referring also to FIG. 3, the three-way switch of the lamp socket 20 is designated 24 and has a wiper 25 mechanically coupled to the knob 23 and electrically connected to the hot wire 22 for selective connection to three different sets of fixed contacts in three different switch positions, respectively designated 1–3, for respectively connecting the hot wire 22 to an output terminal 27, an output terminal 28 or terminals 27 and 28 in parallel. The switch also has an output terminal 26 connected directly to the neutral wire 21.

FIG. 3 illustrates a first embodiment of electronic lamp ballast 30, for the fluorescent lamp 15. The ballast 30 includes an AC-to-DC conversion circuit in the form of a voltage controller 31, and a DC-to-AC conversion circuit including a frequency controller 40 and a lamp driver 50.

Figure 5:
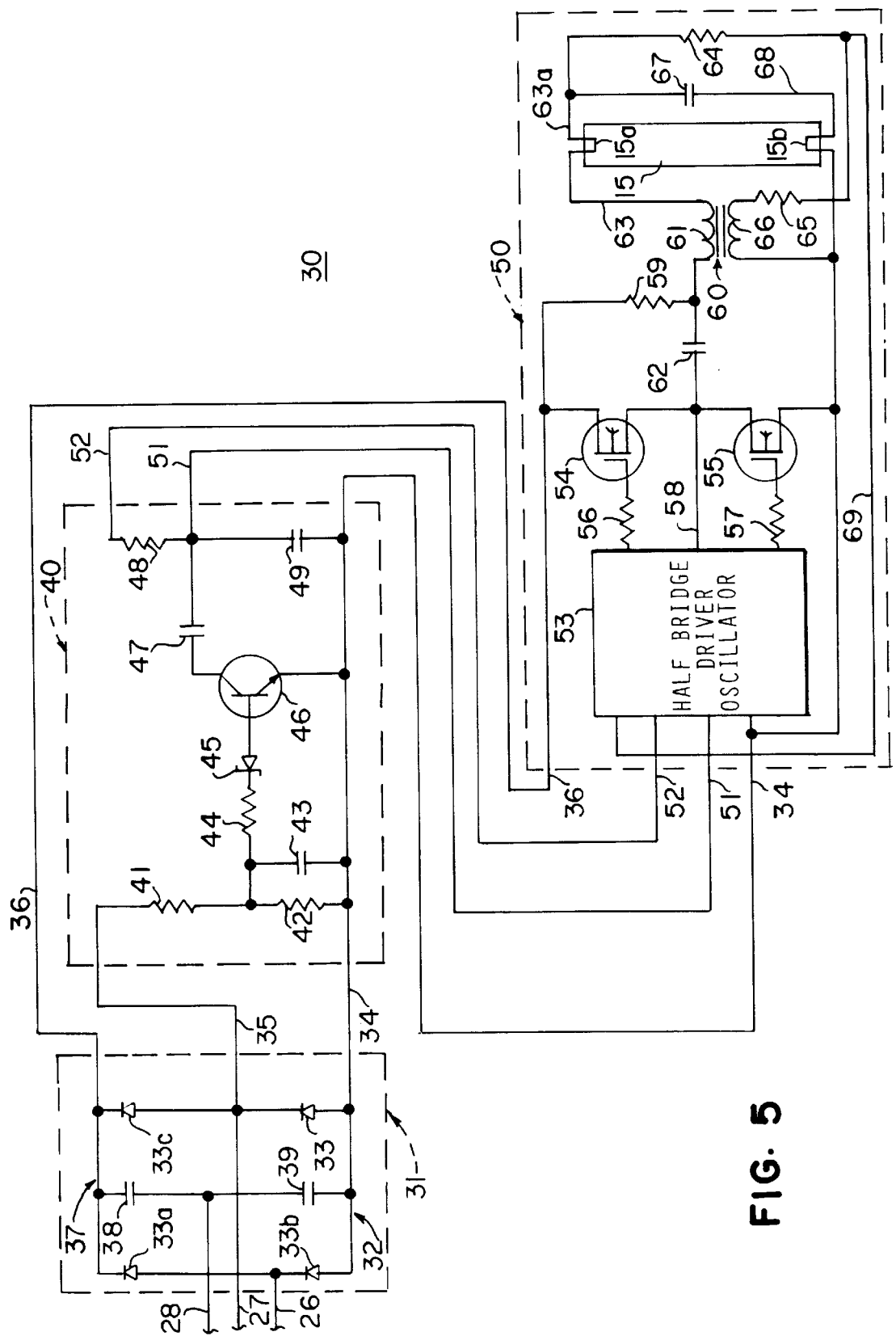
FIG. 5 is a schematic circuit diagram of the ballast of FIG. 3.

Referring also to FIG. 5, the voltage controller 31 includes a full bridge rectifier comprising diodes 33a–33d connected across the input terminals 26 and 27 for producing a DC supply voltage across output terminals 34 and 36. The voltage controller 31 also has a third output terminal 35 connected to the input terminal 27 at the junction between the bridge diodes 33c and 33d. Thus, a frequency control voltage across the diode 33d is produced across the output terminals 34 and 35. The voltage controller 31 also includes a voltage doubler 37 including a pair of capacitors 38 and 39 connected in series across the output terminals 34 and 36 of the bridge, the junction between the capacitors 38 and 39 being connected to the input terminal 28.

In operation, when the switch 24 is in position 1, so that the AC input voltage is applied across input terminals 26 and 27, the AC voltage is rectified by the bridge rectifier 32 and the capacitors 38 and 39 function as filter capacitors. In this switch position, a first DC supply voltage level is provided across the output terminals 34 and 36 and a first frequency control voltage level is provided across the output terminals 34 and 35. In switch position 2, when the AC supply voltage is applied across the input terminals 26 and 28, the diodes 33a and 33b function has a half bridge rectifier and the capacitors 38 and 39 function has a voltage doubler, for producing across the output terminals 34 and 36 a second DC supply voltage level which is approximately twice that of the switch position 1. In this position 2 the voltage across the output terminals 34 and 35 is less than in switch position 1. In switch position 3, when the AC supply voltage is applied to both of the input terminals 27 and 28, the AC voltage is full bridge rectified and doubled to produce the second DC supply voltage level across the output terminals 34 and 36, while there is produced across the output terminals 34 and 35 a second frequency control voltage level greater than that in switch position 1.

The frequency control voltage at the output terminals 34 and 35 is applied to the frequency controller 40 and, more particularly, across a voltage divider comprising resistors 41 and 42. The voltage across the resistor 42 is filtered by a capacitor 43 and is applied through a resistor 44 and Zener diode 45 to the base of a transistor 46, the emitter of which is connected to ground and the collector of which is connected through a capacitor 47 to an output terminal 51, which is also connected to ground through a capacitor 49 and, through a resistor 48, to another output terminal 52.

The output terminals 51 and 52, as well as the output terminals 34 and 36 from the voltage controller 31, are all connected to the lamp driver 50. More specifically, the lamp driver 50 includes an oscillator circuit including a half bridge driver oscillator 53 having input terminals connected, respectively, to the terminals 34, 51 and 52. The oscillator circuit also includes two MOSFETs 54 and 55 connected in series across the terminals 34 and 36, so as to directly receive the DC supply voltage provided by the voltage controller 31. The gates of the MOSFETs 54 and 55 are, respectively connected to outputs of the half bridge driver oscillator 53 through resistors 56 and 57, while the junction between the MOSFETs 54 and 55 is connected to the source of high side driver 58 of the half bridge driver oscillator 53. Connected in series across the output terminals 34 and 36 of the voltage controller 31 are a resistor 59, a first winding 61 of a transformer 60, a conductor 63, a filament 15a of the fluorescent lamp 15, a conductor 63a, resistors 64 and 65, and the other winding 66 of the transformer 60. The junction between the resistor 59 and the transformer winding 61 is also connected through a capacitor 62 to the source of high side driver 58 of the half bridge driver oscillator 53. The terminal 34 is also connected to the filament 15b of the lamp 15. A capacitor 67 is connected across the lamp 15 via conductor 68. The junction between the resistors 64 and 65 is connected via a feedback line 69 to an input of the half bridge driver oscillator 53.

The half bridge driver oscillator 53 is preferably an integrated circuit and generates a high-frequency output, the frequency f of which is determined by the resistance R between terminals 52 and 51 and the capacitance C between terminals 51 and 34. More specifically, f is proportional to 1/RC. The capacitance C is controlled by the frequency control voltage across the output terminals 34 and 35 of the voltage controller 31. The transistor 46 is driven through the Zener diode 45. When the three-way switch 24 is in either of its positions 1 and 2, applying power to only one of the input terminals 27 or 28, the frequency control voltage across the terminals 34 and 35 is sufficient to drive the transistor 46 into conduction. In these switch positions the oscillating frequency of the half bridge driver oscillator 53 is determined solely by the resistor 48 and the capacitor 49, which cause the half bridge driver oscillator 53 to generate a first high frequency. A resonant loop for the lamp 15 is formed by the capacitor 62, the inductance of the transformer winding 61 and the capacitor 67.

When the switch 24 is in position 3, connecting the AC supply voltage to both of the input conductors 27 and 28, the voltage across the output terminals 34 and 35 of the voltage controller 31 rises to a value sufficient to turn the transistor 46 on, connecting the capacitor 47 in parallel with the capacitor 49 and changing the frequency of the half bridge driver oscillator 53 to a second high frequency. Lamp filament starting current is provided through the resistor 59 and capacitor 67. The second coil 66 of the transformer 60 and the resistor 65 provide a feedback voltage to the half bridge driver oscillator 53 via the feedback line 69 to stabilize the oscillations.

While the operating frequency of the lamp 15 remains the same for each of the first two positions of the switch 24, the operating voltage thereof does not. As was explained above, the DC operating voltage across the output terminals 34 and 36 in the switch position 2 is about twice that in the switch position 1, and this DC operating voltage is applied directly to the lamp driver 50. Thus, the lamp driver 50 is provide with two DC operating voltage levels and two different operating frequencies so as to provide three different light output levels for the lamp 15. It will be appreciated that, when the operating frequency of the lamp 15 changes, the impedance of the transformer 60 changes accordingly to change the current through the lamp 15 and, thereby, the light output thereof.

The actual percentage of full lamp output that is provided for each of the three light output levels will vary depending upon the particular lamp 15 and the particular circuit component values in the ballast 30. In one constructional model of the invention, the capacitors 38 and 39 are 22 microfarad, the resistors 41 and 42 are, respectively, 200K ohm an 8.2K ohm, the capacitor 43 is 47 uf, the capacitors 47 and 49 are, respectively, 390 pf and 680 pf, the resistor 48 is 19K ohm, the resistors 59 and 64 are each 300K ohm, the capacitor 62 is 0.22 microfarad and the capacitor 67 is $3 \times 10^{-9}$ farad. The IC 53 may be an L6569 of the type manufactured by S. G. Thompson. With these components, when the switch 24 is in position 1 powering input terminal 27, the DC operating voltage is 167 volts and the lamp operating frequency is 55 khz to produce a lamp light output 30% of full output. When the switch 24 is in position 2, powering the input terminal 28, the DC operating voltage is 310 volts, the operating frequency remains 55 khz and the lamp light output is increased to 70% of full output. When the switch 24 is in its position 3 powering both of terminals 27 and 28, the DC operating voltage is again 310 volts, while the lamp operating frequency is 35 khz, producing full lamp output.

Because the filament 15a of the lamp 15 is connected in series with the supply circuit through the transformer winding 61, the driver oscillator 53 will not work if the lamp 15 is removed or if the filament 15a is broken. This will prevent overheating of the ballast circuit after the lamp 15 burns out. Also, because the second winding 66 of the transformer is connected in the feedback circuit, this will also prevent operation of the circuit if there is no resonance established, as in the event of a bad lamp.

Figure 4:
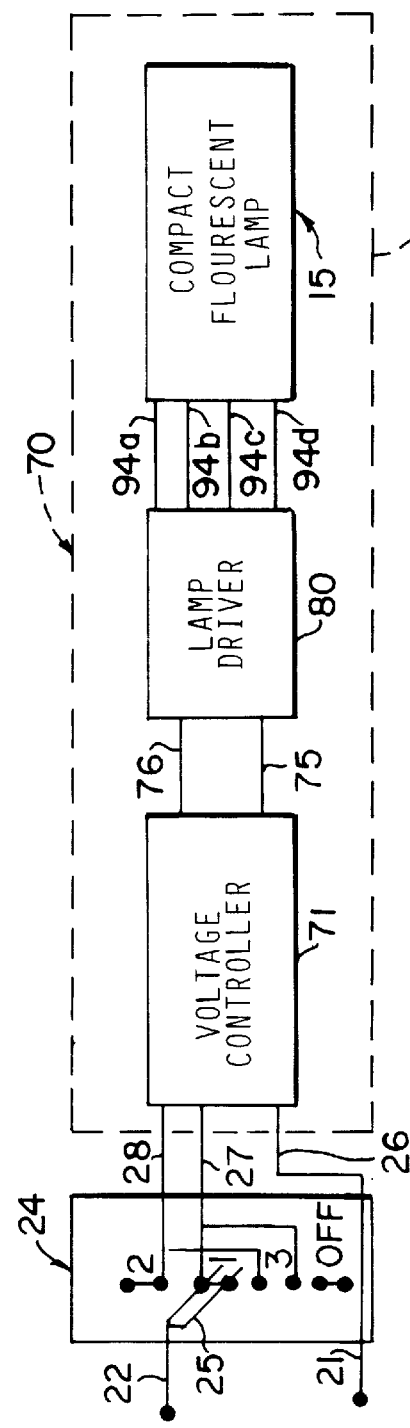
FIG. 4 is a view similar to FIG. 3 illustrating a second embodiment of electronic ballast for the lamp.
Figure 6:
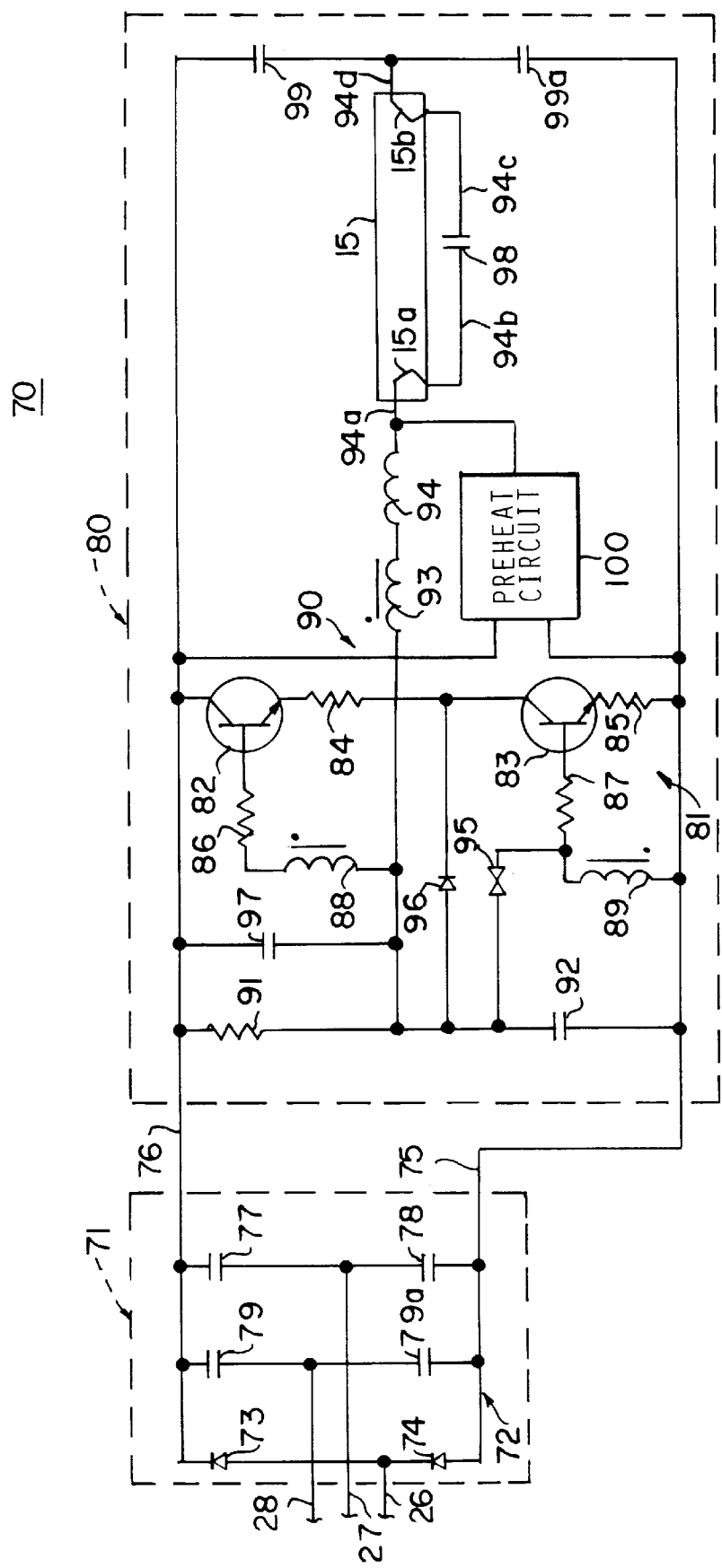
FIG. 6 is a schematic circuit diagram of the ballast of FIG. 4.

Referring now to FIGS. 4 and 6, there is illustrated another ballast 70 in accordance with the present invention, which includes a AC-to-DC conversion circuit in the form of a voltage controller 71 and a DC-to-AC conversion circuit in the form of a lamp driver 80. The voltage controller 71 includes a bridge circuit 72, one-half of which includes diodes 73 and 74 connected across output terminals 75 and 76. The other half of the bridge includes a first pair of capacitors 77 and 78 connected in series across the output terminals 75 and 76 and a second pair of capacitors 79 and 79a also connected across in series the output terminals 75 and 76. The junction between the diodes 73 and 74 is connected to the input terminal 26, the junction between the capacitors 77 and 78 is connected to the input terminal 27, while the junction between the capacitors 79 and 79a is connected to the input terminal 28.

In switch position 1, AC supply voltage is applied across the input terminals 26 and 27, the diodes 73 and 74 serving as a half-bridge rectifier, the capacitors 77 and 78 acting as a voltage doubler, and the capacitors 79 and 79a serving has a filter to produce a first rectified DC output voltage across the output terminals 75 and 76. In the position 2, when the AC supply voltage is applied across the input terminals 26 and 28, the input is again rectified by the diodes and the capacitors 79 and 79a act as a voltage doubler, while the capacitors 77 and 78 act as a filter to produce a second DC output voltage level. In switch position 3, when the AC supply is applied to both of the input terminals 27 and 28, both of the capacitor pairs act as voltage doublers to produce a third rectified DC output voltage level. Thus, the three DC output voltage levels are determined by the values of capacitors 79, 79a and 77, 78.

The lamp driver 80 includes an oscillator circuit 81 including transistors 82 and 83 which act as switches, the collector of the transistor 82 being connected to the terminal 76 and its emitter being connected through a resistor 84 to the collector of the transistor 83, the emitter of which is connected through a resistor 85 to the terminal 75. The base of the transistor 82 is connected through a resistor 86 and a winding 88 of a transformer 90 to the junction between a resistor 91 and a capacitor 92, which form a voltage divider connected in series across the terminals 75 and 76. The base of the transistor 83 is connected through a resistor 87 and another winding 89 of the transformer 90 to the terminal 75. The junction between the resistor 91 and the capacitor 92 is also connected through a third winding 93 of the transformer 90 and an inductor 94 to the filament 15a of the lamp 15 via a conductor 94a.

The oscillator circuit 81 has a trigger circuit which includes a diac 95 connected from the junction between the resistor 91 and capacitor 92 to the junction between the resistor 87 and transformer winding 89. The trigger circuit also includes a diode 96 connected in parallel with the base-collector circuit of the transistor 83, the resistor 87 and the diac 95. A capacitor 97 is connected in parallel with the resistor 91. A capacitor 98 is connected across the lamp 15 via conductors 94b and 94c.

The filament 15b of the lamp 15 is connected via a conductor 94d to the junction between two capacitors 99 and 99a which are connected in series across the terminals 75 and 76. Also connected across the terminals 75 and 76 is a preheat circuit 100, the output of which is connected to the filament 15a via the conductor 94a. The transformer 90 has a magnetic ring core, the windings 88 and 89 being oppositely wound, and the winding 93 being wound the same as the winding 88.

The transformer 90 is used to generate oscillation in the circuit, which is triggered through the diac 95. The inductor 94, the capacitor 98 and the capacitors 99 and 99a form a resonant circuit to start the lamp 15, the inductor 94 keeping the lamp current stabilized. Once oscillations are started, the diode 96 shorts the trigger diac 95. The preheat circuit 100 provides filament current to the lamp before it is ignited. The resistors 84 and 85 provide feedback of temperature changes.

It will be appreciated that, for each of the three DC operating voltages provided by the voltage controller 71, a different light level output is provided by the lamp 15. While this circuit works well, the ballast 30 of FIG. 5 is preferred, since the ballast 70 produces a high capacitor ripple current when small value capacitors are used in the voltage controller 71, tending to heat the capacitors and shorten their useful life. It can be difficult to select capacitors so as to provide the desired light output levels while, at the same time, providing an acceptably low ripple current at low light output levels.

In a constructional model of the ballast 70, the resistor 78 is 470K ohm, the capacitor 92 is 10 nf, the resistors 84 and 85 are 1.5 ohm and the resistors 86 and 87 are 22 ohm. The capacitors 99 and 99a are 0.1 microfarad, while the values of the inductor 94 and the capacitor 98 depend upon the wattage of the lamp 15. With these component values, the ballast 70 may produce DC supply voltages of 150, 260 and 290 volts in the three switch positions, to produce light output levels of 50%, 80% and 100% of full light output.

From the foregoing, it can be seen that there has been provided an improved method of varying the light output level of a fluorescent lamp, and an improved multiple-light-level fluorescent lamp unit and electronic ballast therefor implementing that method, the ballast providing multiple light output levels by using multiple DC operating voltages or a combination of different operating voltages and different operating frequencies, all in a base adapted to be controlled by a standard three-way lamp socket.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. A ballast for a multiple-light-level fluorescent lamp circuit comprising:
   an AC-to-DC conversion circuit having three input terminals and an output and including a rectifying circuit connected directly to a first terminal set including at least a first one of the input terminals and a voltage multiplying circuit connected to a second terminal set including at least a second one of the input terminals for producing plural DC output voltage levels including at least two DC operating voltage levels, and
   a DC-to-AC conversion circuit having an input connected to the output of the AC-to-DC conversion circuit and an output adapted to be coupled to the associated lamp and having plural output conditions respectively corresponding to the DC output voltage levels.

2. The ballast of claim 1, wherein said rectifying circuit includes a full rectifier bridge connected across the output of said AC-to-DC conversion circuit and across two of its input terminals.

3. The ballast of claim 2, wherein said voltage multiplying circuit includes two capacitors connected in series across the output of said AC-to-DC conversion circuit, with the junction between the two capacitors being connected to the third input terminal.

4. The ballast of claim 1, wherein said rectifying circuit includes a half bridge rectifier.

5. The ballast of claim 4, wherein the rectifier includes two rectifier elements connected in series across the output of the AC-to-DC conversion circuit with the junction between the rectifiers connected to a first one of the input terminals, said voltage multiplying circuit including a first voltage doubler having two first capacitors connected in series across the output of the AC-to-DC conversion circuit with the junction between the first capacitors connected to a second one of the input terminals, and a second voltage doubler having two second capacitors connected in series across the output of the AC-to-DC conversion circuit with the junction between the second capacitors connected to a third one of the input terminals.

6. The ballast of claim 1, wherein the DC-to-AC conversion circuit includes an oscillator and a resonant circuit.

7. The ballast of claim 6, wherein the AC-to-DC conversion circuit has a frequency control output producing plural frequency control voltage levels, and further comprising a frequency control circuit connected to the oscillator and to the AC-to-DC conversion circuit for varying the operating frequency thereof in response to variation in the frequency control voltage levels.

8. The ballast of claim 6, and further comprising a trigger circuit for initiating operation of the oscillator and responsive to oscillation for disconnection from the oscillator.

9. A compact, multiple-light-level, fluorescent lamp unit for use in a three-way-switched AC lamp socket comprising:
   a three-terminal base adapted to fit in the socket;
   a fluorescent lamp supported on the base; and
   a ballast mounted on the base and including
      a non-inductive rectifying and voltage-multiplying circuit having three input terminals respectively connected to the terminals of the base and generating a DC output having a variable voltage including at least two DC operating voltage levels depending on the switch condition of the socket, and
      a lamp drive circuit coupled to the output of the rectifying and voltage-multiplying circuit and generating an oscillatory drive signal coupled to the lamp for operating same at a light output level which varies with the DC output voltage.

10. The fluorescent lamp unit of claim 9, wherein said rectifying and voltage-multiplying circuit has a pair of output terminals and includes a rectifying circuit and two voltage doubling circuits connected in parallel across the output terminals and respectively connected to the input terminals.

11. The fluorescent lamp unit of claim 10, wherein the rectifying and voltage-multiplying circuit includes a bridge connected across the output terminals and including a pair of rectifiers in one half of the bridge with the junction between the rectifiers connected to a first input terminal, and a pair of first capacitors forming the other half of the bridge with the junction between the first capacitors connected to a second input terminal, and a pair of second capacitors connected in parallel with the pair of first capacitors with the junction between the second capacitors connected to a third input terminal.

12. The fluorescent lamp unit of claim 9, wherein said rectifying and voltage-multiplying circuit includes three output terminals and produces a lamp driving voltage across a first pair of the output terminals and a frequency control voltage across a second pair of the output terminals.

13. The fluorescent lamp unit of claim 12, wherein the rectifying and voltage-multiplying circuit includes a full rectifier bridge with an output connected across the first pair of output terminals and an input connected across a first two of the three input terminals, and two capacitors connected in series across the first pair of output terminals with the junction between the capacitors connected to a third input terminal, and with the second pair of output terminals connected across one leg of the bridge.

14. The fluorescent lamp unit of claim 12, wherein said lamp drive circuit includes an oscillator circuit and a frequency control circuit therefor, said oscillator circuit having power supply terminals respectively connected to said first pair of output terminals and frequency control terminals respectively connected to said second pair of output terminals.

15. The fluorescent lamp unit of claim 14, wherein said lamp drive circuit includes a voltage supply circuit connected in series with a filament of the fluorescent lamp.

16. The fluorescent lamp unit of claim 14, wherein said lamp drive circuit includes a resonant circuit connected to the lamp.

17. The fluorescent lamp unit of claim 16, and further comprising: a feedback circuit connected from the resonant circuit to the oscillator circuit for stabilizing the operating frequency of the oscillator circuit.

18. A method of varying the light output level of a fluorescent lamp having a ballast circuit with an operating voltage and an operating frequency, comprising:

varying the operating voltage of the ballast circuit, and varying the operating frequency of the ballast circuit.

19. The method of claim 18, wherein the ballast circuit has two operating voltages and two operating frequencies, and further comprising switching the ballast circuit between the two operating voltages for one of the operating frequencies and switching the ballast circuit between the two operating frequencies for one of the operating voltages.

\* \* \* \* \*